United States Patent
Neygandhi et al.

(10) Patent No.: US 11,154,850 B2
(45) Date of Patent: Oct. 26, 2021

(54) CR6 REDUCTION IN FLUIDIZED BED

(71) Applicant: Clariant Corporation, Louisville, KY (US)

(72) Inventors: Chris Neygandhi, Frankfurt (DE); Michael Dyballa, Frankfurt (DE); Lisa Voelkl, Kelkheim (DE); Roman Bobka, Rosenheim (DE); Nicole Ando, Louisville, KY (US)

(73) Assignee: Clariant Corporation, Louisville, KY (US)

( * ) Notice: Subject to any disclaimer, the term of this patent is extended or adjusted under 35 U.S.C. 154(b) by 9 days.

(21) Appl. No.: 16/191,855

(22) Filed: Nov. 15, 2018

(65) Prior Publication Data

US 2019/0184389 A1    Jun. 20, 2019

Related U.S. Application Data

(60) Provisional application No. 62/598,605, filed on Dec. 14, 2017.

(51) Int. Cl.
   *B01J 37/16*    (2006.01)
   *B01J 37/02*    (2006.01)
   (Continued)

(52) U.S. Cl.
   CPC .............. *B01J 37/16* (2013.01); *B01J 21/04* (2013.01); *B01J 23/26* (2013.01); *B01J 35/026* (2013.01);
   (Continued)

(58) Field of Classification Search
   CPC ... B01J 37/16; B01J 21/04; B01J 23/26; B01J 35/026; B01J 37/0201; B01J 37/0203; B01J 37/0209
   See application file for complete search history.

(56) References Cited

U.S. PATENT DOCUMENTS

| | | |
|---|---|---|
| 4,247,480 A | 1/1981 | Murata |
| 5,583,258 A | 12/1996 | Hawkins |
| | (Continued) | |

FOREIGN PATENT DOCUMENTS

| | | |
|---|---|---|
| DE | 102013014267 | 3/2015 |
| GB | 1535608 | 12/1978 |

OTHER PUBLICATIONS

Victoria G. Sánchez et al.; "Synthesis, Surface-Active Properties, and Anthekmintic Activities of . . . " J Surfact Deterg (2012) 15:463-470.

(Continued)

*Primary Examiner* — James A Fiorito

(57) ABSTRACT

Disclosed is a process for the manufacture of a chromium-containing catalyst with a reduced amount of chromium-(VI)-oxide which process comprises the steps:
  a) preparing a solid particulate chromium-containing oxidic catalyst comprising Cr-(VD-oxide,
  b) introducing the solid particulate catalyst into a reactor in which the catalyst particles are mixed using process gas and/or mechanical means,
  c) introducing a reducing agent for chromium-(VI) into the reactor,
  d) treating the solid particulate catalyst with the reducing agent in the reactor for a time, at a temperature and at a pressure, so that the chromium-(VI) content in the particulate catalyst is considerably reduced by the reducing agent, and
  e) discharging the solid particulate catalyst comprising a reduced chromium-(VI) content from the reactor.
The disclosed process is simple and efficient and allows manufacture of chromium-containing oxidic catalysts with low content of Cr-(VI)-oxide on an industrial scale.

20 Claims, 2 Drawing Sheets

(51) Int. Cl.
    *B01J 23/26*         (2006.01)
    *B01J 21/04*         (2006.01)
    *B01J 35/02*         (2006.01)

(52) U.S. Cl.
    CPC ....... *B01J 37/0201* (2013.01); *B01J 37/0203* (2013.01); *B01J 37/0209* (2013.01); *B01J 2203/00* (2013.01); *B01J 2219/00029* (2013.01); *B01J 2219/00033* (2013.01)

(56) References Cited

U.S. PATENT DOCUMENTS

| | | | |
|---|---|---|---|
| 5,679,633 | A | 10/1997 | Tseng |
| 6,221,002 | B1 * | 4/2001 | James ................ A62D 3/37 210/747.8 |
| 7,622,623 | B2 | 11/2009 | Fridman |
| 8,680,357 | B1 | 3/2014 | Rokicki |
| 9,725,380 | B2 | 8/2017 | Fridman |
| 10,035,119 | B2 * | 7/2018 | Fridman ................ B01J 8/0496 |
| 10,137,437 | B2 | 11/2018 | Sokolovskii |
| 2005/0075243 | A1 | 4/2005 | Fridman |

OTHER PUBLICATIONS

Xian-Rong Xu, Kinetics of the Reduction of Chromium(VI) by Vitamin C; Environmental Toxicology and Chemistry vol. 24. No. 6 pp. 1310-1314 (2005).

* cited by examiner

CR6 REDUCTION IN FLUIDIZED BED

This application claims the benefit of priority of U.S. Provisional Patent Application No. 62/598,605, filed Dec. 14, 2017, which is hereby incorporated herein by reference in its entirety.

BACKGROUND OF THE INVENTION

The present invention relates to a manufacturing process for chromium containing oxide-catalysts which contain no or only traces of chromium in the oxidation state (VI) ("chromium-(VI)").

Chromium containing oxide-catalysts are used in the catalysis of many chemical processes.

US 2014/0273794 A1, US 2005/0075243 A1, US 2007/0054801 A1, US 2015/0259265 A1 and U.S. Pat. No. 8,680,357 B1 disclose these catalysts for dehydrogenation reactions of hydrocarbon feedstocks.

DE 10 2013 006 251 A1 describes the preparation of a supported oxide catalyst, which can be used for partial oxidation or ammon oxidation of olefins. Various transition metals are used here as catalytic active components, including chromium. The catalyst is preferably used in the partial oxidation/ammon oxidation of olefins, such as propene or isobutene, to acrolein/acrylonitrile or to methacrolein by gas phase oxidation in the presence of oxygen.

DE 10 2013 014 267 A1 discloses a process for the manufacture of a copper and chromium-containing mixed oxide, that can be used as a catalyst for the dehydrogenation of alcohol and for hydrogenation reactions, such as for the reduction of nitro compounds or for the hydrogenation of carboxylic acids.

When producing a metal containing oxidic catalyst, usually a calcination step is performed. Thereby the transition metal is oxidized and in the case of chromium a portion of the chromium turns into the oxidation state (VI).

While Cr(III) is water-insoluble and not considered as hazardous for the human health, Cr(VI) is classified as toxic, carcinogenic and mutagenic. Due to this character of Cr(VI), $Cr(VI)O_3$ belongs to the class of hazardous compounds defined by REACH. The regulations concerning these compounds will continuously be tightened. An upcoming REACH legislation in Europe (2017) prohibits the shipment of goods containing hazardous compounds such as Cr(VI). According to this regulation, goods which contain >0.1% $Cr(VI)O_3$ are considered as hazardous and are prohibited from shipment. In consequence, there exists the need for oxidic chromium-containing catalysts in which the chromium is present in a lower oxidation state.

It is known from the literature that Cr-(VI)-oxide can be reduced to Cr-(III)-oxide using different liquid reducing agents. In addition, a gas-phase reduction is possible, for example with hydrogen or with forming gas. Solutions of ascorbic acid can be used as a liquid reducing agent in soil and sewage treatment to reduce the Cr-(VI)-oxide ("Kinetics of the Reduction of Chromium(VI) by vitamin C; Authors: Xian-Rong Xu, Hua-Bin Li, Ji-Dong Gu, Xiao-Yan Li, Environmental toxicology and chemistry Vol. 24. No. 6 pp. 1310-1314, 2005).

Therefore it was to be expected that the reduction of Cr-(VI)-oxide with ascorbic acid known already from the literature could also be used for the reduction of Cr-(VI)-oxide in oxidic catalysts. In laboratory trials it was demonstrated that by impregnating catalyst pellets with a solution of ascorbic acid the Cr-(VI)-oxide present in the catalyst could be significantly reduced.

But when transferring the results of the laboratory trials into the production scale, several problems occurred. Without a solution of these, an economic industrial scale production with constant high quality was not possible. The following problems occurred during scale-up to industrial scale:

the catalyst was not reduced sufficiently due to inhomogenous wetting by incipient wetness;

the catalyst quality was reduced (lower abrasion resistance, lower breaking resistance) as a consequence of the dwelling of the catalyst pellets in the impregnating solution active catalyst components were washed out by the impregnation solution resulting in reduction of quality (dip impregnation)

the catalyst was damaged during impregnation as a result of the development of high temperatures caused by the exothermic reaction and non-sufficient heat removal waste water containing reduction agents and catalyst components was generated (dip impregnation with subsequent draining of impregnation solution)

DESCRIPTION OF THE INVENTION

Figure 1:
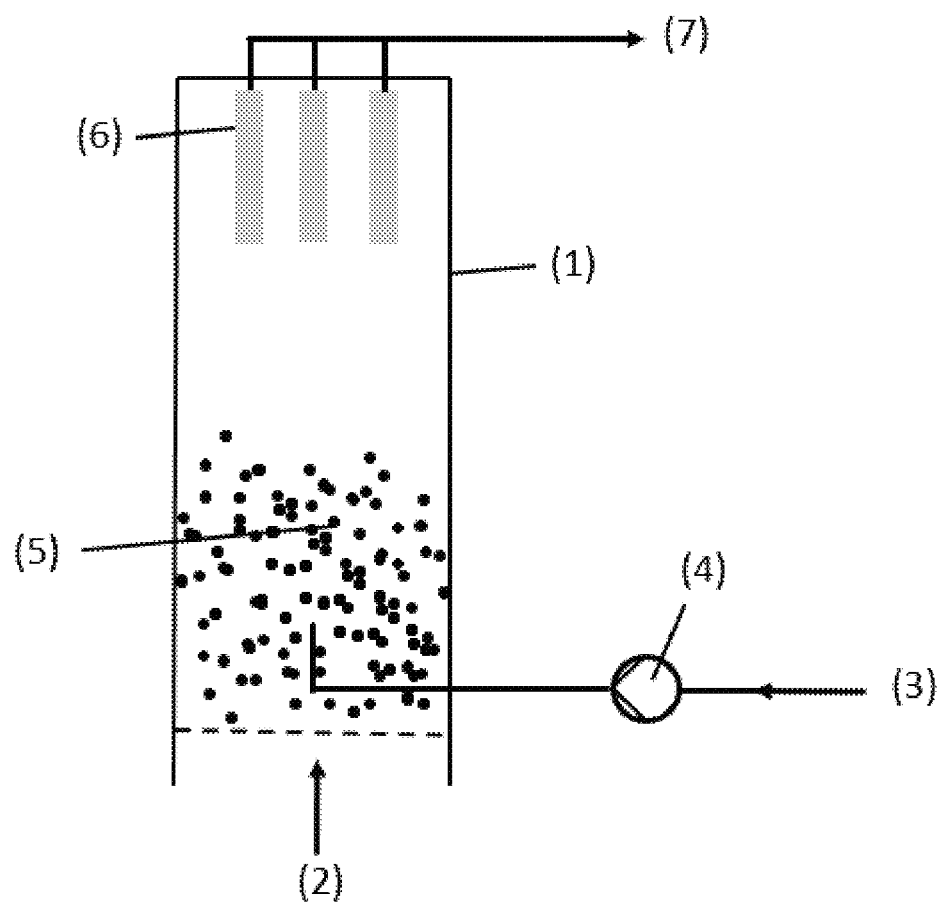
FIG. 1 presents a scheme for a fluidized bed reactor operated in batch mode.

Against this background, the objective of the present invention was to develop an industrial scale process which allows the economic production of a catalyst with a Cr-(VI)-content as low as possible, without having a negative influence on the catalyst quality.

The invention relates to a process for the manufacture of a chromium-containing catalyst with a reduced amount of Cr-(VI)-oxide which process comprises the steps:

a) preparing a solid particulate chromium-containing oxidic catalyst comprising Cr-(VD-oxide, b) introducing the solid particulate catalyst into a reactor in which the catalyst particles are mixed using process gas and/or mechanical means c) introducing a reducing agent for chromium-(VI) into the reactor, d) treating the solid particulate catalyst with the reducing agent in the reactor for a time, at a temperature and at a pressure, so that the chromium-(VI) content in the particulate catalyst is considerably reduced by the reducing agent, and e) discharging the solid particulate catalyst comprising a reduced chromium-(VI) content from the reactor.

Many types of solid particulate chromium-containing oxidic catalysts comprising Cr-(VI)-oxide can be used in the process of this invention. The particulate catalyst can be chromium oxide(s) or a combination of chromium oxide(s) with other metal oxide(s). The catalyst particles can be present in bulk form, e.g. they consist of metal oxide(s) including chromium oxide(s). Preferably the catalyst particles are inert carrier particles covered with chromium oxide(s) or with a combination of chromium oxide(s) with other metal oxide(s).

Inert carriers can be porous or non-porous. However, the inert carrier is preferably porous. The carrier preferably consists of particles with a regular or irregular shape, such as for example spheres, tablets, cylinders, solid cylinders or hollow cylinders, rings, stars or other shapes.

The inert carrier material can be composed of any non-porous and porous substance, preferably porous substance. Examples of materials for this are titanium oxide, silicon oxide, aluminium oxide, zirconium oxide, magnesium oxide, silicon carbide, magnesium silicate, zinc oxide, zeolites, sheet silicates and nanomaterials, such as for example carbon nanotubes or carbon nanofibres.

The above-named oxidic carrier materials can be used for example in the form of mixed oxides of defined compositions, such as for example $TiO_2$, $SiO_2$, $Al_2O_3$, $ZrO_2$, MgO, SiC or ZnO. Furthermore, soots, ethylene black, charcoal, graphite, hydrotalcites or further carrier materials known per se to a person skilled in the art can be used in different possible modifications. The carrier materials can be doped—besides the chromium-oxide or chromium-oxide/metal oxide combination—for instance with phosphorus, halide and/or sulphate salts.

Preferred examples of chromium-containing oxidic catalysts are aluminia-chromium catalysts, such as aluminia-chromium catalysts comprising from 10 to 40% b.wt. of chromium oxide calculated as $Cr_2O_3$, and 50-90% of aluminia oxide calculated as $Al_2O_3$. Moreover, typical Al—Cr-catalysts comprise from 0.3-5% b.wt. of alkali or alkali-earth metals selected from the group consisting of Na, Li, K, Cs, Mg, Sr, Ca, Ba and combinations thereof. Aluminia-chromium catalysts may further contain one or more promoters that are usually in the form of oxides. These promotor metals may be selected from the group consisting of Sc, La, Mo, W, Zr, Sn, Mn, Ca and mixtures thereof.

In the process of this invention the solid particulate chromium-containing oxidic catalyst comprising chromium-(VI) is charged into a reactor, where it is intensively mixed mechanically and/or by using a process gas. The process gas can simultaneously act as a reducing agent, e.g. by using hydrogen as a process gas.

The reducing agent is introduced into the reactor using a suitable means, e.g. via a spray nozzle for liquid reduction agents or by pouring or as process gas for gaseous reduction agents.

The reactor is operated in a way ensuring a good heat transfer between the catalyst particles, where the exothermic reaction takes place, and the surrounding media. This protects the catalyst from damage by local high-temperature hot spots. A cooling effect by evaporation of the solvent can improve this effect.

Examples of reactors, which can be used in the process of this invention are double cone mixers, ploughshare mixers or fluidized bed rectors.

In a preferred embodiment of this invention the reactor is a fluidized bed reactor. This type of reactor ensures high heat and mass transfer inside the reaction chamber and allows a very homogeneous mixing.

In a preferred mode of operation the solid catalyst particles within the reactor are swirled in a glide layer of process gas.

A fluidized bed is a physical phenomenon occurring when a quantity of a solid particulate substance is placed under appropriate conditions to cause a solid/fluid mixture to behave as a fluid. This is usually achieved by the introduction of gas through the particulate solid medium. This results in the medium then having many properties and characteristics of normal fluids, such as the ability to free-flow under gravity, or to be pumped using fluid type technologies. The resulting phenomenon is called fluidization.

The reducing agent used in the process of this invention may be introduced into the reactor in the form of a solution or in pure form, e.g. as a gas.

The reducing agent used in the process of this invention is preferably an aqueous solution of an organic acid as a reducing agent such as formic acid, citric acid or ascorbic acid, most preferably a solution of ascorbic acid.

In treatment step d) of the process of this invention preferably a temperature and pressure is provided within the reactor to cause the solvent of the solution of the reducing agent to evaporate.

In a preferred embodiment a solution of one or more reducing agents is sprayed into the reactor.

In the process of this invention different reducing agents can be used. Preferred examples thereof are ascorbic acid or formic acid.

These reducing agents can be combined with different solvents such as water or organic solvents with acid concentration from 5-50%, preferable from 7.5-25% and most preferable from 10 to 20%.

Preferably an aqueous solution of ascorbic acid is used.

In general, the application of two impregnation techniques of the solid particulate chromium-containing oxidic catalyst comprising chromium-(VI) can be considered for liquid reducing agent or the solution of the reducing agent
 1) incipient wetness impregnation, and
 2) dip impregnation.

For incipient wetness impregnation the volume of the impregnation solution applied equals the free volume of the pores or is only slightly above. This technique is driven by capillary action processes.

For dip impregnation, an excess of the impregnation liquid or of the impregnation solution is used in which the catalyst is dipped for wetting. The catalyst is completely wetted and excess liquid or solution is usually drained.

The process of the invention can be performed in batch or in continuous operation mode.

The process of the present invention method has several advantages compared to other methods for reducing metal-oxide catalysts:

short contact time of the impregnation solution with the catalyst. There is no "soaking" of the catalyst as in dip or incipient wetness impregnation and thus improved mechanical properties result. In case of a fluidized bed, the solvent evaporates immediately, at a sufficiently high fluidized bed temperature (e.g. at 80° C.), so that the catalyst is not damaged by the solvent of the impregnation solution/by the reducing agent
 excellent process and temperature control possible as several process parameters can be adjusted, such as temperature, pressure, dosing rate of impregnation solution and concentration of impregnation solution
 no catalyst constituents are leached since the impregnation solution is not drained off—instead, simultaneously dried throughout reduction
 no waste impregnation solution/waste reducing agent is generated
 no damage of the catalyst by local temperature hot-spots (exothermic reaction) due to excellent heat and mass transfer from the catalyst to the surrounding media.
 due to the well controllable process and the simultaneous impregnation and drying, the consumption of reducing agent, and the loading of residual reducing agent on the catalyst is controllable Using the process of the present invention chromium-containing oxide catalysts with very low chromium-VI contents can be prepared. These can be used in different catalytic processes, for example in the dehydrogenation of hydrocarbons.

The following example illustrates the invention.

In this example a Glatt AGT 3 fluidized bed equipment was used.

A particulate chromium-oxide containing catalyst was charged into the fluidized bed device. The catalyst consisted of cylindrical pellets (d≈3 mm, l≈3-10 mm) and contained carrier: $Al_2O_3$, Cr-(III)-oxide: 10-20% and Cr-(VI)-oxide: 1-2.5%.

The particulate catalyst was fluidized with air or another process gas (gas inlet temperature: 140° C., 80 ($m^3$/h) air/kg product).

Ascorbic acid solution was sprayed into the fluidized bed device using a rate, so that a bed temperature of 60-80° C. was obtained.

After a defined amount of ascorbic acid solution had been sprayed into the fluidized bed, the product was discharged from the fluidized bed chamber.

In the resulting product the Cr-(VI)-oxide content was reduced to <3 ppm. The catalyst contained a residual moisture of <1% and dry ascorbic as well as dehydro ascorbic acid remaining on the catalyst.

The process of this example can be preformed in batch-wise manner and in continuous manner.

FIG. 1 shows a batchwise operated fluidized bed reactor (1). Process gas is introduced into reactor (1) via process gas inlet(s) (2). Liquid reduction agent is introduced into the reactor (1) via pipe (3) which is operated by pump (4) and which is equipped with a spray nozzle at the outlet within reactor (1). At the beginning of the process the reactor (1) is charged with particulate chromium-oxide containing catalyst. During the operation the process gas is introduced via inlet(s) (2) and causes the particulate catalyst to form a fluidized bed (5). The process gas is discharged via process gas filters (6) and is introduced into outlet pipe (7). After finalization of the reduction process the operation is terminated and the reduced particulate catalyst is discharged from reactor (1). Process parameters, among others, are inlet temperature and volume flow of process gas, inlet temperature and volume flow of liquid reduction agent, temperature of the product bed and temperature of the discharged process gas.

Figure 2:
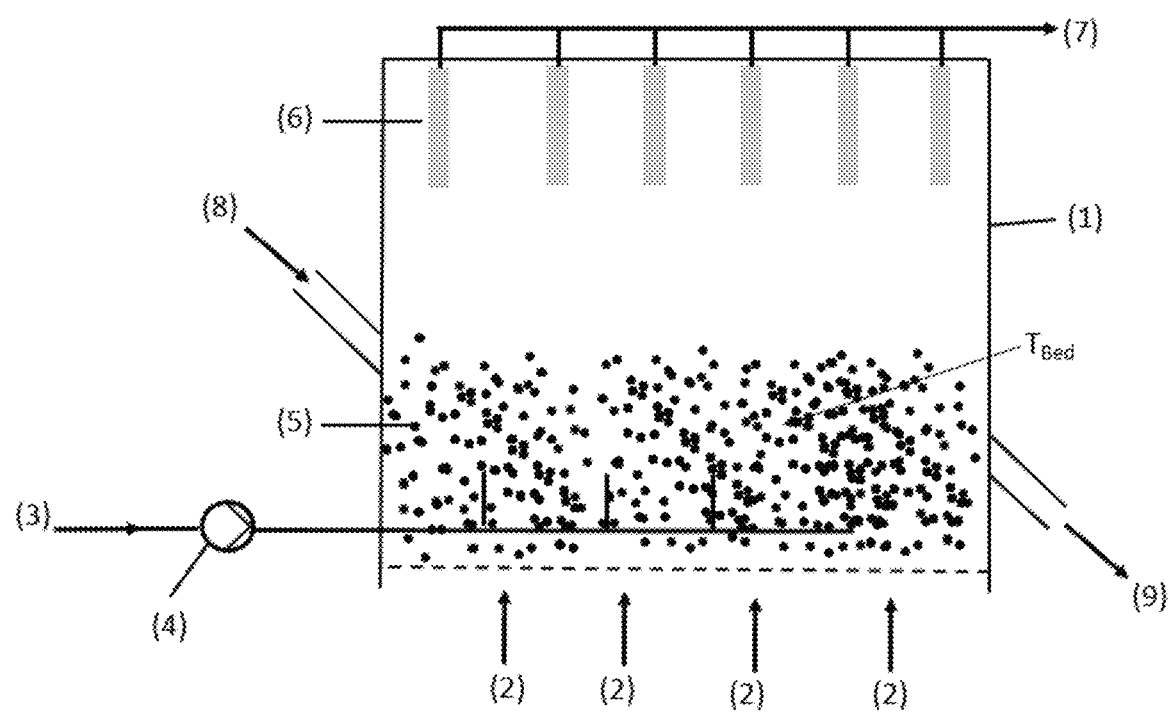
FIG. 2 presents a scheme for a fluidized bed reactor operated in continuous mode.

FIG. 2 shows a continuously operated fluidized bed reactor (1). Process gas is introduced into reactor (1) via process gas inlet(s) (2). Liquid reduction agent is introduced into the reactor (1) via pipe (3) which is operated by pump (4) and which is equipped with different spray nozzles at the outlets within reactor (1). During the operation of the process the reactor (1) is continuously charged with particulate chromium-oxide containing catalyst via catalyst inlet (8) and the reduced product is discharged via catalyst outlet (9). During the operation the process gas is introduced via inlet(s) (2) and causes the particulate catalyst to form a fluidized bed (5). The process gas is discharged via process gas filters (6) and is introduced into outlet pipe (7). Process parameters, among others, are inlet temperature and volume flow of process gas, inlet temperature and volume flow of liquid reduction agent, temperature of the product bed, temperature of the discharged process gas and charge rate as well as discharge rate of the particulate catalyst.

What is claimed is:

1. A process for the manufacture of a chromium-containing catalyst with a reduced amount of chromium-(VI)-oxide, the process comprising:

a) preparing a solid particulate chromium-containing oxidic catalyst comprising chromium oxide disposed on an oxidic carrier material, wherein the chromium oxide comprises Cr-(VI)-oxide, and wherein the chromium oxide is present in the solid particulate catalyst in an amount of 10-40 wt. %, calculated as $Cr_2O_3$, b) introducing the solid particulate catalyst into a reactor in which the catalyst particles are mixed using process gas and/or mechanical means, c) introducing a liquid reducing agent for chromium-(VI) into the reactor via a spray nozzle or by pouring, d) treating the solid particulate catalyst with the reducing agent in the reactor for a time, at a temperature and at a pressure, so that the chromium-(VI) content in the particulate catalyst is substantially reduced by the reducing agent, and then e) discharging the solid particulate catalyst from the reactor.

2. The process of claim 1, wherein the solid particulate chromium-containing oxidic catalyst is an alumina-chromium.

3. The process of claim 1, wherein the reactor is a double cone mixer, a ploughshare mixer or a fluidized bed reactor.

4. The process of claim 3, wherein the reactor is a fluidized bed reactor.

5. The process of claim 1, wherein the reducing agent is a solution of an organic reducing agent.

6. The process of claim 5, wherein the organic reducing agent is ascorbic acid.

7. The process of claim 6, wherein an aqueous solution of ascorbic acid is used.

8. The process of claim 5, wherein in treatment step d) a temperature and pressure is provided within the reactor to cause the solvent of the solution of the reducing agent to evaporate.

9. The process of claim 1, wherein the solid particulate chromium-containing oxidic catalyst comprising chromium-(VI) is impregnated with a liquid reducing agent or with a solution of reducing agent using incipient wetness impregnation or dip impregnation.

10. The process of claim 1, wherein the process is operated in batch mode.

11. The process of claim 1, wherein the process is operated in continuous mode.

12. The process of claim 1, wherein the treating with the reducing agent is performed to provide the solid particulate catalyst with less than 3 ppm Cr(VI) oxide.

13. The process of claim 1, wherein the solid particulate chromium-containing oxidic catalyst is an alumina-chromium catalyst comprising 50-90 wt % of aluminum oxide calculated as $Al_2O_3$ as the oxidic carrier material.

14. The process of claim 5, wherein the organic reducing agent is formic acid, citric acid or ascorbic acid.

15. The process of claim 1, wherein the oxidic carrier material is titanium oxide, silicon oxide, aluminum oxide, zirconium oxide, magnesium oxide, silicon carbide, magnesium silicate, zinc oxide, zeolites, sheet silicates, carbon nanotubes, carbon nanofibers, or any mixture thereof.

16. The process of claim 1, wherein the oxidic carrier material is titanium oxide, silicon oxide, aluminum oxide, zirconium oxide, magnesium oxide, silicon carbide, zinc oxide, or any mixture thereof.

17. A process for the manufacture of a chromium-containing catalyst with a reduced amount of chromium-(VI)-oxide, the process comprising:

a) preparing a solid particulate chromium-containing oxidic catalyst comprising chromium oxide disposed on an oxidic carrier material, wherein the chromium oxide comprises Cr-(VI)-oxide, and wherein the chromium oxide is present in the solid particulate catalyst in an amount of 10-40 wt. %, calculated as $Cr_2O_3$, b) introducing the solid particulate catalyst into a reactor in which the catalyst particles are mixed using process gas and/or mechanical means, c) introducing an organic acid reducing agent for chromium-(VI) into the reactor, d) treating the solid particulate catalyst with the reducing agent in the reactor for a time, at a temperature and at a pressure, so that the chromium-(VI) content in the particulate catalyst is substantially reduced by the reducing agent, and then e) discharging the solid particulate catalyst from the reactor.

18. The method of claim 17, wherein the organic acid reducing agent is formic acid, citric acid, ascorbic acid, or any mixture thereof.

19. The method of claim 1, wherein the solid particulate catalyst introduced into the reactor has an amount of chromium(VI) oxide in excess of 0.1 wt %.

20. The method of claim 1, wherein the solid particulate catalyst introduced into the reactor has an amount of chromium(VI) oxide in the range of 1-2.5 wt %.

* * * * *